United States Patent

[11] 3,620,390

[72] Inventor Richard E. McKinnon
Taylorville, Ill.
[21] Appl. No. 882,998
[22] Filed Dec. 8, 1969
[45] Patented Nov. 16, 1971
[73] Assignee Specialized Products, Inc.
Taylorville, Ill.

[54] APPARATUS FOR SPREADING PARTICULATE MATERIAL
10 Claims, 4 Drawing Figs.

[52] U.S. Cl...................................................... 214/17 CB, 239/687
[51] Int. Cl...................................................... B65g 65/32
[50] Field of Search............................................ 214/17 CB; 239/687; 198/128; 302/60

[56] References Cited
UNITED STATES PATENTS
3,248,117 4/1966 Donelson...................... 214/17 CB X
3,411,643 11/1968 Cymara........................ 214/17 CB Primary Examiner—Robert G. Sheridan
Attorney—Koenig, Senniger, Powers and Leavitt ABSTRACT: Apparatus for spreading particulate material, such as grain, in a circular bin having a roof and a center opening in the roof for the delivery of the material into the bin comprising a spinning cup having a conical annular wall of decreasing diameter from top to bottom and having openings in the wall for centrifugal discharge of the material from the cup with decreasing volume and velocity of discharge from top to bottom of the cup for evenly spreading the material around the bin.

APPARATUS FOR SPREADING PARTICULATE MATERIAL

BACKGROUND OF THE INVENTION

This invention relates to apparatus for spreading particulate material, and more particularly to apparatus for spreading grain in a circular bin.

The invention is especially concerned with apparatus for spreading grain delivered by a conveyor to a central opening in the roof of a circular bin around the bin in such manner as to fill the bin evenly. Heretofore, a spinning disk with ribs extending radially outwardly from its center has been used for this purpose, but such a spreader does not spread the grain evenly and when the grain strikes a rib, there is a tendency to break or crack the kernel.

SUMMARY OF THE INVENTION

Among the several objects of this invention may be noted the provision of apparatus for spreading particulate material such as grain evenly around circular bins of widely varying diameters; the provision of such apparatus which will not become easily clogged and which will not break or crack the kernels when spreading grain; and the provision of a spreading apparatus which is light in weight, easily installed in bins, and inexpensive to manufacture and maintain. In general, apparatus of this invention adapted for spreading particulate material such as grain in a circular bin having a roof and a central opening in the roof for delivering the material into the bin comprises a cup having an annular wall of decreasing diameter from the top to the bottom of the cup, means for mounting the cup with its axis vertical at the top of the bin below the center opening, so that material (e.g., grain) fed through the opening is delivered to the cup; and means for spinning the cup on its vertical axis. The cup has openings for centrifugal discharge of the material from the cup with decreasing volume and velocity of discharge from the top toward the bottom of the cup. Other objects and features will be in part apparent and in part pointed out hereinafter.

DESCRIPTION OF THE PREFERRED EMBODIMENT

Figure 1:
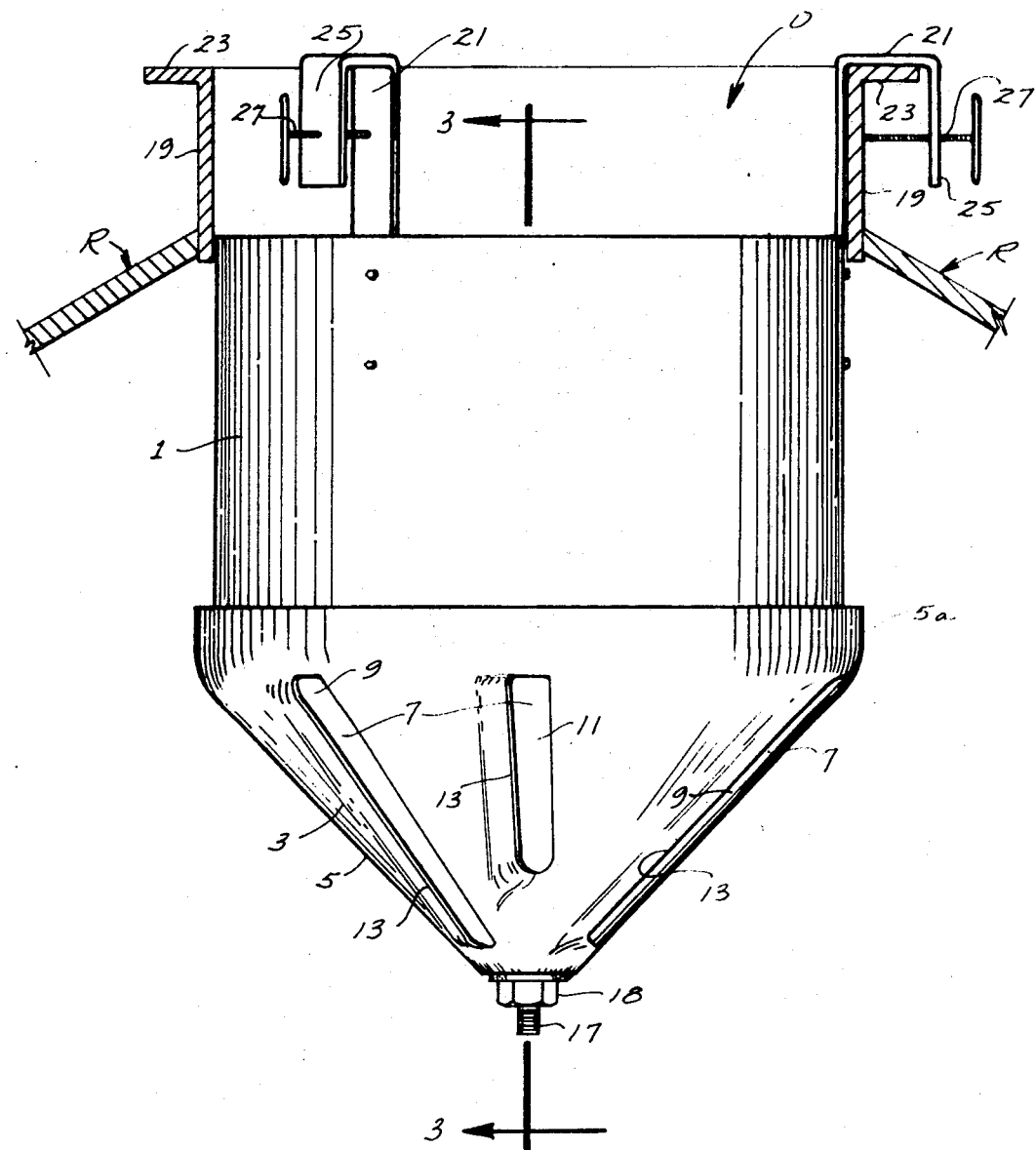
FIG. 1 is a fragmentary section of a center opening of a bin for storing grain and a front elevation of the apparatus of this invention.
Figure 2:
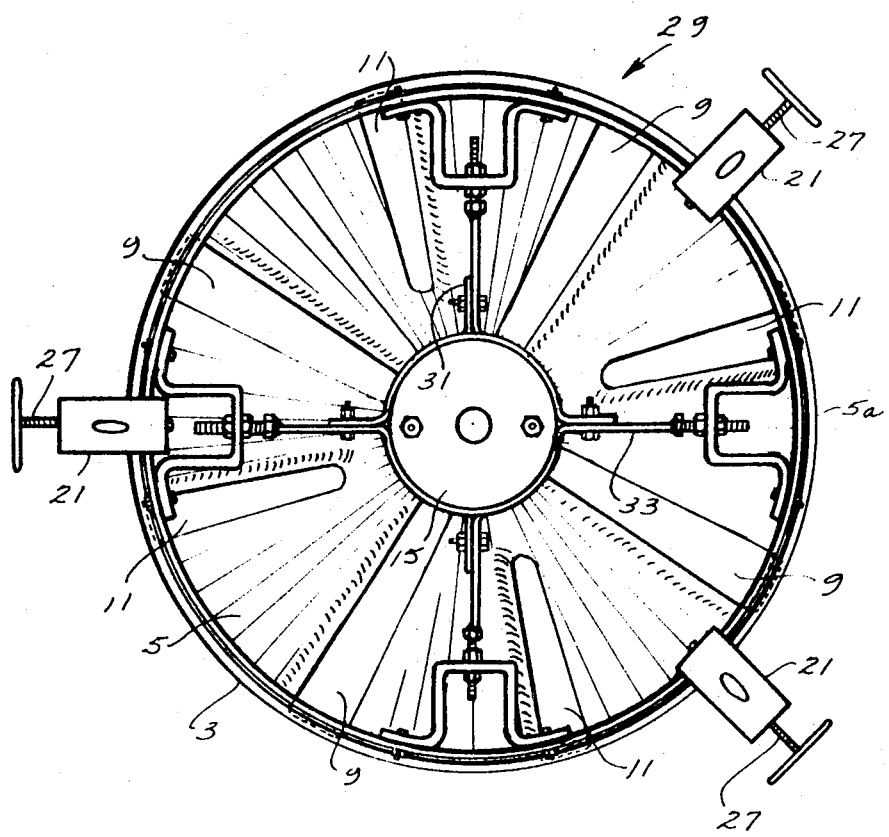
FIG. 2 is a plan view of the apparatus.
Figure 3:
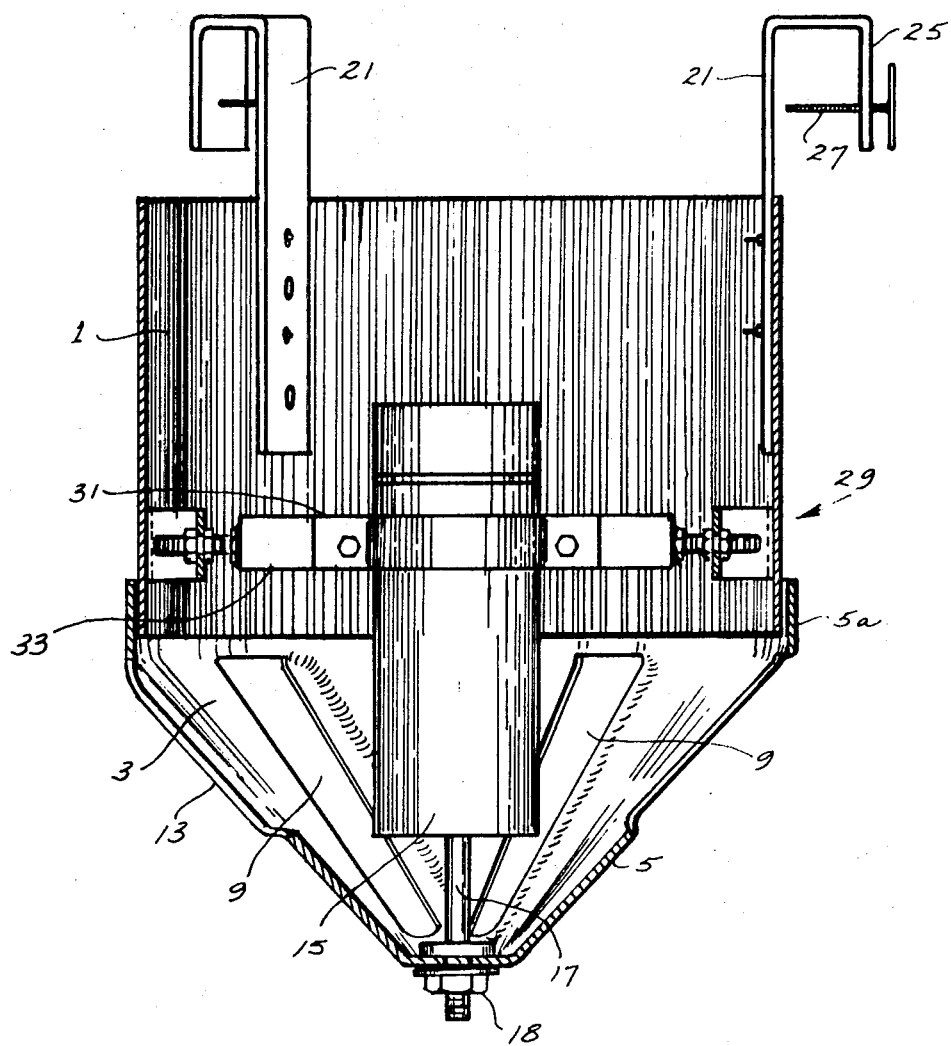
FIG. 3 is a section taken on line 3—3 of FIG. 1.
Figure 4:
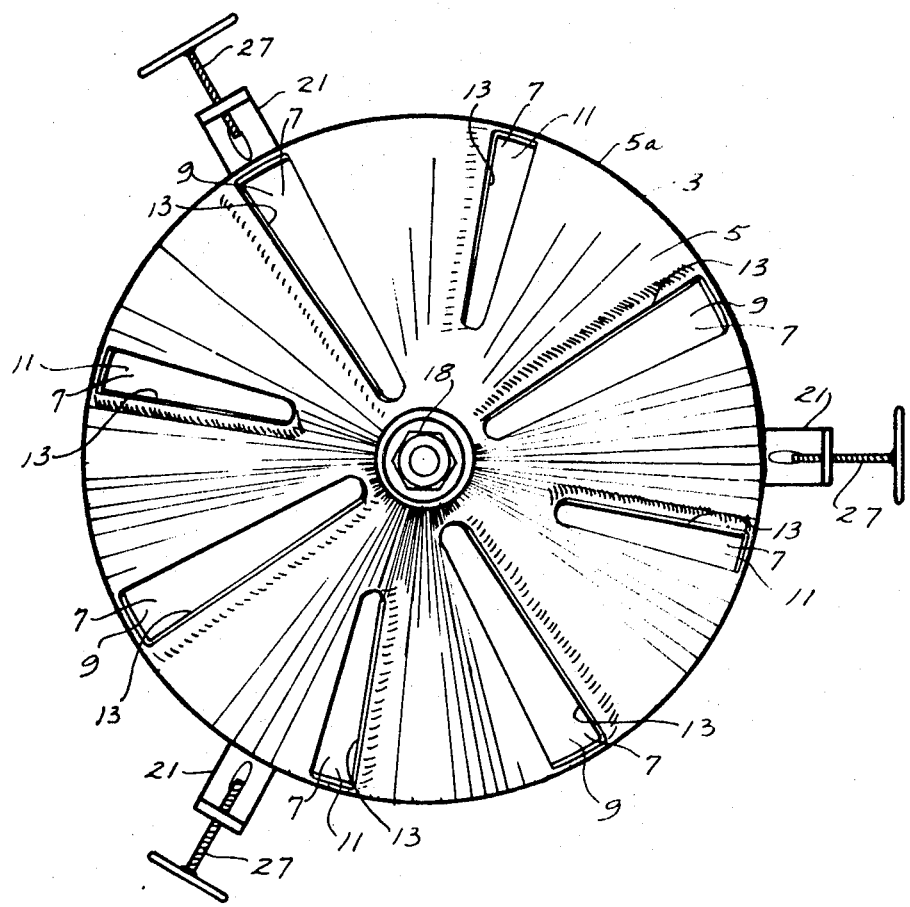
FIG. 4 is a bottom plan of FIG. 1. Corresponding reference characters indicate corresponding parts throughout the drawings. X

Referring now to the drawings, FIG. 1 shows apparatus for spreading particulate material such as grain as it is installed in a circular bin having a conical roof R and a center opening O in the roof for delivering grain into the bin. The apparatus comprises a vertical delivery chute 1 for delivering grain to a spreader cup 3 which spins on its vertical axis for spreading the grain. The chute (and cup) are suspended from roof R in line with opening O. Grain delivered to opening O by a conveyor (not shown) falls through the chute 1 and into the cup 3. The cup 3 has an annular wall 5 of decreasing diameter from the top to the bottom, this wall having openings 7 through which the grain is centrifugally discharged into the bin. The centrifugal discharge from the cup decreases in volume and velocity from top to bottom of the cup so that the material will be spread evenly around the bin. The contour of the annular wall of the cup may vary so long as the diameter decreases from top to bottom. The preferred shape of the annular wall is conical, having a pitch of approximately 20°–50° with the preferred pitch being about 35°. The 35° pitch provides for an even distribution of the material without the material striking the opposing conical-shaped roof of the bin, which normally has a pitch of 30°–45°. The openings 7 in the annular wall 5 of the cup for centrifugal discharge of the material from the cup are constituted by slots 9 and 11 extending in the direction from top to bottom of the annular wall. The annular wall 5 is offset outwardly adjacent a longitudinal edge 13 of each slot to provide a surface that is angled slightly radially outwardly adjacent each slot to assist in centrifugally discharging the grain through the slots. Certain of the slots, namely the slots 9, are long slots extending from the top of the cup to adjacent the bottom. The slots 11 alternating with the long slots 9 are short slots extending downwardly from the top of the cup. The slots 9 and 11 are also tapered being wider at the top than at the bottom. With the slots tapered as described, and with twice as many slots in the upper portion of wall 5 as in the lower portion, the volume and velocity of grain discharged from the upper part of the cup are greater than the volume and velocity of grain discharged from the lower part of the cup. Thus, grain discharged through the openings adjacent the top of the cup will be thrown outward a considerable distance for delivering grain to the outer annular zone of the bin and in sufficient volume to fill said zone. Grain discharged through the openings adjacent the bottom of the cup is thrown outward a lesser distance and in lesser volume for filling the central circular zone of the bin. The overall effect is that grain centrifugally discharged by the cup is spread relatively evenly around the bin.

Means for spinning the cup about its vertical axis is shown to comprise an electric motor 15 arranged axially within the cup with its shaft 17 extending downwardly and secured as indicated at 18 at its lower end to the bottom of the cup. Means is provided for adjusting the speed of the motor and the motor is of a type which maintains its speed constant, once adjusted, despite variations in load. Varying the spinning speed of the cup varies the centrifugal discharge pattern of the grain so that the area over which the grain is spread increases with higher cup speeds. Thus, the apparatus may be used in bins of various diameters and the spinning speed of the cup adjusted to spread the grain evenly around the bin. The grain being fed to the cup via the delivery chute is generally not fed at a constant rate but dumped into the cup in batches. This produces large variations in the load on the motor. By using a motor having the characteristic of maintaining a set speed despite these variations in load, even distribution of the grain is attained. It is preferred to use a direct-current permanent magnet motor, which has said characteristic, in conjunction with a rheostat for varying the set speed of the motor. A motor of this type is the MAGNOPAK motor sold by Graham transmissions, Inc., Menomonee Falls, Wis. This motor will draw up to five times its rated amperage in order to maintain the set speed.

The vertical delivery chute 1 extends downwardly with its lower end extending into the upper end of the cup 3 to provide a conduit for delivering to the cup grain fed through the opening 0 in the roof of the bin. The upper end of the cup is preferably made cylindrical as indicated at 5a and of slightly greater diameter than chute 1. The chute also functions with the motor 15 as means for mounting the cup with its axis substantially vertical at the top of the bin below the opening 0. As shown in FIG. 1, the roof R of the bin has a collar 19 around the opening 0, this collar extending upward from the roof. The chute 1 is fastened to this collar 19, by means of three flat bars 21 extending upwardly from the upper end of the chute, the upper ends of these bars 21 being bent at a right angle and extending radially outwardly over a rim 23 on the collar 19. Bars 21 terminate with a downwardly extending portion 25. The downwardly extending portion 25 is drilled and tapped for a locking screw 27 which engages the collar 19 to secure the apparatus to the bin. The motor, arranged axially within the cup with its shaft extending downwardly and secured at its lower end to the bottom of the cup, has its upper end extending into the chute 1. Supporting means generally indicated at 29 extending between the chute and the motor secures the motor within the chute. This supporting means 29 comprises a spider assembly 31 fastened to the upper end of the motor, the spider assembly having four radial arms 33 which are fastened to the chute 1 to secure the motor to the chute.

The apparatus for spreading particulate material as hereinbefore described will spread particulate material such as grain evenly in bins ranging from 18 feet to 42 feet in diameter when the speed of the cup is adjusted between 300 and 800 r.p.m. There are no baffles, so clogging is minimal and breaking and cracking of the kernels of grain is eliminated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What I claim is:

1. Apparatus for spreading particulate material such as grain in a circular bin, the bin having a roof and a central opening in the roof for delivery of said material into the bin, said apparatus comprising a vertical delivery chute having means for attaching it to the roof extending downwardly therefrom in line with said opening in the roof, a cup having an annular wall of decreasing diameter from the top to the bottom of the cup, means for mounting the cup with its axis substantially vertical at the lower end of the chute with the rim of the cup surrounding and adjacent the lower end of the chute, said mounting means being located within the chute and comprising spaced arms adapted for free flow of said material therebetween for relatively unobstructed delivery to the cup of material fed in through said chute, and means for spinning the cup on its vertical axis, said cup having openings for centrifugal discharge of said material from the cup with decreasing volume and velocity of discharge from the top toward the bottom of the cup.

2. Apparatus as set forth in claim 1 wherein said annular wall is conical.

3. Apparatus as set forth in claim 2 wherein said means for spinning the cup comprises an electric motor arranged axially within the cup with its shaft extending downwardly and secured at its lower end to the bottom of the cup.

4. Apparatus as set forth in claim 3 wherein said means for mounting the cup is fastened to the motor.

5. Apparatus as set forth in claim 2 wherein said openings are constituted by slots extending in the direction from top to bottom of the conical annular wall.

6. Apparatus as set forth in claim 5 wherein certain of said slots are long slots extending from adjacent the bottom to the top of the cup and others are short slots, the short slots alternating with the long slots.

7. An apparatus as set forth in claim 5 wherein the annular wall is offset outwardly adjacent a longitudinal edge of each slot.

8. An apparatus as set forth in claim 1 wherein the means for spinning the cup is an electric motor, having means for adjusting the speed of the motor and means for maintaining the speed constant once adjusted despite variations in load.

9. An apparatus as set forth in claim 3 wherein the electric motor is of a type adapted to maintain a constant speed despite variations in load.

10. An apparatus as set forth in claim 3 wherein the electric motor is an adjustable speed, direct-current, permanent magnet motor, rheostatically controlled and adapted to maintain a set speed despite variations in load.

* * * * *